Dec. 18, 1928.  
J. F. O'CONNOR  
1,695,500  
FRICTION SHOCK ABSORBING MECHANISM  
Filed July 23, 1927   2 Sheets-Sheet 2
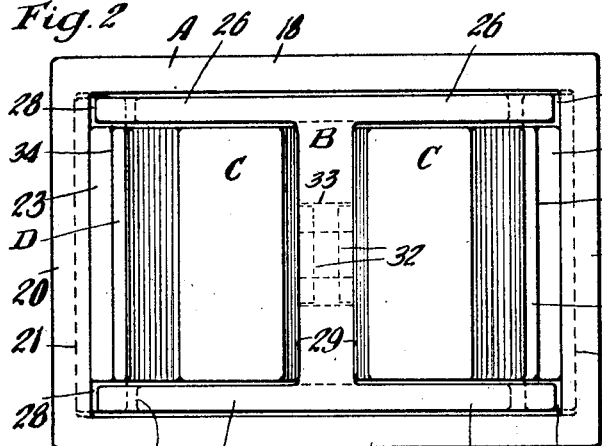
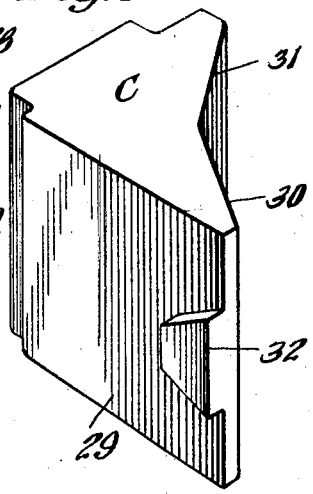
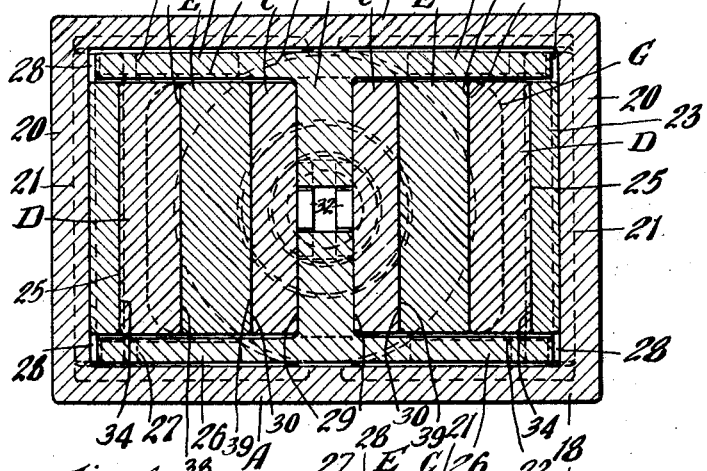
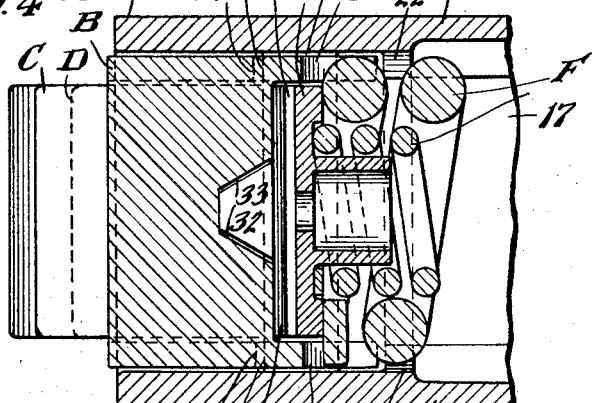
Witness  
Wm. Geiger
Inventor  
John F. O'Connor  
By George L. Haight  
His Atty.

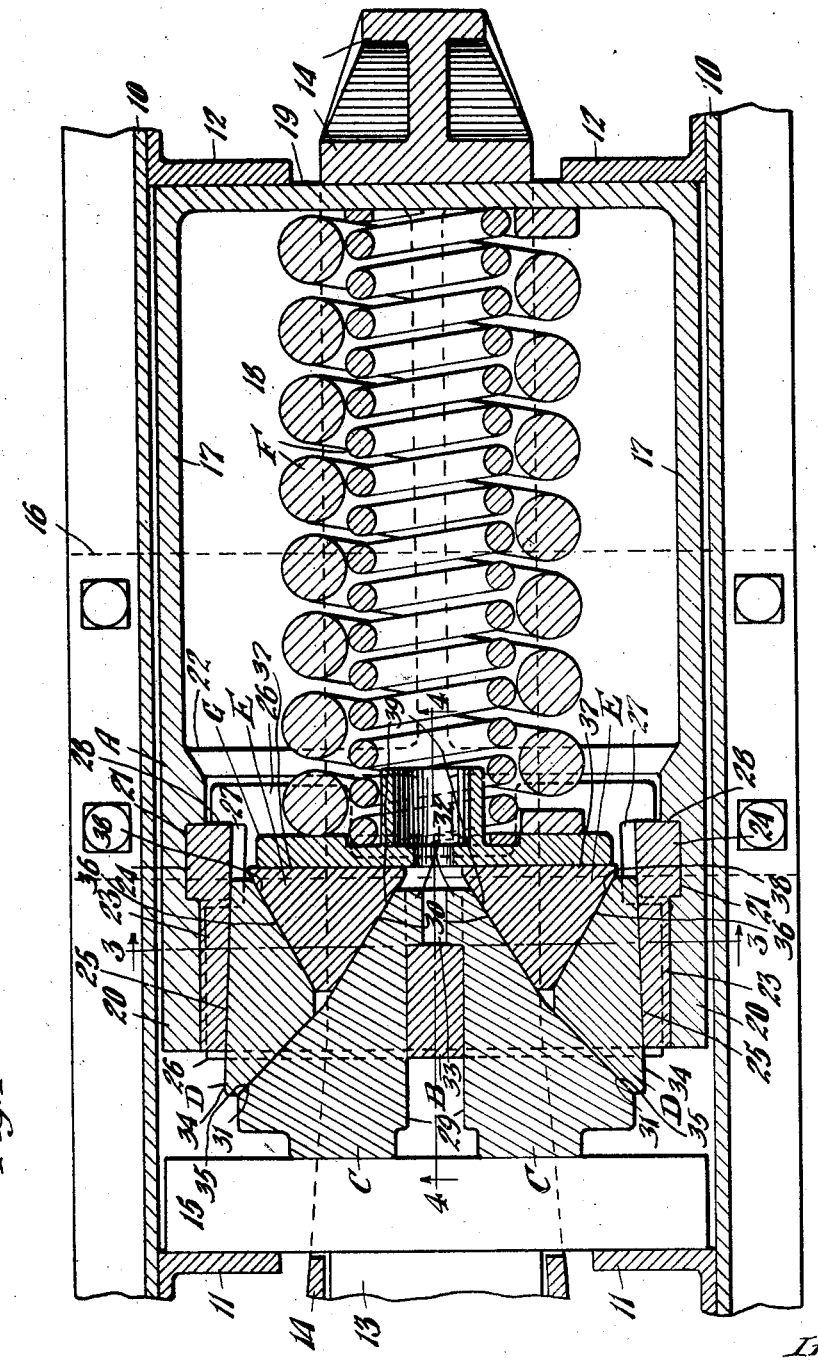

Patented Dec. 18, 1928.

1,695,500

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed July 23, 1927. Serial No. 207,945.

This invention relates to improvements in friction shock absorbing mechanisms.

One object of the invention is to provide a friction shock absorbing mechanism of high capacity, especially adapted for railway draft riggings, including a friction system comprising a plurality of differential wedge members and friction shoes cooperating with a friction shell and additional friction means relatively to which the wedge members and shoes are movable to provide for high frictional resistance combined with differential action.

A more specific object of the invention is to provide a friction shock absorbing mechanism of the character indicated, including a friction shell having opposed, inwardly converging friction surfaces, a central friction post, friction means relatively movable with respect to the post and shell friction surfaces, wherein the friction means cooperates with a plurality of wedge pressure transmitting members, friction shoes and wedge blocks resisted by spring means, the wedge pressure transmitting members having wedging engagement with the friction shoes and wedge block at different wedging angles, whereby differential action is affected in addition to the wedging action to produce high capacity.

Other objects of the invention will more clearly appear from the description and claims hereinafter following.

In the drawings forming a part of this specification, Figure 1 is a horizontal, longitudinal sectional view of a railway draft rigging showing my improvements in connection therewith. Figure 2 is a front end elevational view of the shock absorbing mechanism proper. Figure 3 is a transverse, vertical, sectional view corresponding substantially to the line 3—3 of Figure 1. Figure 4 is a longitudinal, vertical sectional view of the forward end portion of the shock absorbing mechanism proper, corresponding substantially to the line 4—4 of Figure 1. And Figure 5 is a detail perspective view of one of the wedge pressure transmitting blocks employed in connection with my improved shock absorbing mechanism.

In said drawings, 10—10 indicate the usual channel shaped center or draft sills of a railway car underframe to the inner sides of which are secured front stop lugs 11—11 and rear stop lugs 12—12. The inner end portion of the draw bar is designated by 13 to which is operatively connected a yoke 14 of well known form. The shock absorbing mechanism proper and a main follower 15 are disposed within the yoke. The yoke and the parts therewithin are supported in operative position by a detachable saddle plate 16 secured to the draft sills.

My improved shock absorbing mechanism proper comprises broadly a casing A; a friction post B; two pressure transmitting wedge blocks C—C; two friction shoes D—D; two wedge blocks E—E; a main spring resistance F; and a spring follower G.

The casing A is in the form of a substantially rectangular box-like casing having longitudinally extending vertically disposed spaced side walls 17—17, horizontally disposed longitudinally extending spaced top and bottom walls 18—18 and a transverse rear end wall 19. The end wall 19 cooperates with the stop lugs 12 in the manner of the usual rear follower. At the forward end the side walls 17 are inwardly thickened, as indicated at 20. The thickened portions 20 of the side walls are vertically slotted as indicated at 21 inwardly of the front end portion of the casing A for a purpose hereinafter described. The top and bottom walls of the casing A are provided with transverse abutment ribs 22 located at the rear ends of the thickened portions 20 of the side walls. As most clearly shown in Figure 1, the ribs 22 extend inwardly across the casing A and are centrally cut away to accommodate the top and bottom sides of the outer coil of the spring resistance F.

The side walls of the casing A are provided with liners 23 which have enlargements 24 at the rear ends thereof, the enlargements 24 being in the form of vertically disposed relatively wide ribs adapted to seat within the slots 21 of the thickened portions 20 of the side walls to hold the liners 23 against movement longitudinally of the casing A. On the inner side each liner 23 presents a flat longitudinally disposed friction surface 25. The friction surfaces 25 of the opposed liners are preferably converged inwardly of the mechanism. The liners 23 together with the forward end portions of the top and bottom walls 18 define the friction shell section of the casing A. Rearwardly of the friction shell section of the casing, the same presents a spring cage.

The friction post B comprises a relatively heavy vertically disposed central bar-like section having top and bottom laterally projecting plate-like wings 26—26 which extend substantially for the entire width of the casing A. As most clearly illustrated in Figure 1, the plate-like sections 26 project rearwardly from the main body portion of the friction post B and have the opposite side edges adjacent the rear end portions thereof recessed as indicated at 27. The recesses 27 are adapted to receive top and bottom lugs 28 formed integral with the liners 23. As shown in Figure 1, the recesses 27 are of greater length and width than the lugs 28, thereby providing a certain amount of longitudinal movement of the post B with respect to the liners 23 and also permitting lateral inward displacement of the liners in assembling the mechanism as hereinafter more clearly pointed out. The inner edges of the plate-like sections 28 are normally slightly spaced from the front edges of the ribs 22, as most clearly shown in Figure 1, thereby permitting a certain amount of inward movement of the friction post before the plate-like sections 26 engage the ribs 22 to positively arrest movement of the post B.

The pressure transmitting wedge blocks C—C are disposed at opposite sides of the post B and are interposed between the top and bottom plate-like sections 26 of the post. The pressure transmitting wedge blocks C—C are of similar design, each having a flat front end face bearing directly on the main follower 15. On the inner side, each block C presents a longitudinally disposed flat friction surface 29 adapted to cooperate with the friction surface at the same side of the post B. On the outer side, each block C is provided with inner and outer wedge faces 30 and 31, the inner wedge face 30 being disposed at a keener angle with respect to the longitudinal axis of the mechanism than the outer wedge face 31. At the rear end the blocks C are provided with inwardly projecting substantially triangular lugs 32 adapted to engage within pockets or seats 33 provided on opposite sides of the post B to positively limit outward movement of the wedge blocks C.

The two friction shoes D are also of similar design, each having an outer longitudinally disposed flat friction surface 34 adapted to cooperate with the friction surface 25 of the corresponding liner 23. On the inner side each friction shoe D is provided with a front wedge face 35 and a rear wedge face 36, the wedge face 35 being correspondingly inclined to and adapted to cooperate with the wedge face 31 of the pressure transmitting wedge block C at the same side of the mechanism. The wedge faces 36 at the inner ends of the friction shoes D cooperate with the wedge blocks E—E in a manner hereinafter pointed out. As clearly shown in Figures 2 and 3, the friction shoes are also interposed between the top and bottom plate-like sections 26 of the post B.

The two wedge blocks E—E are of similar design, each having a flat transverse rear end face 37 bearing directly on the spring follower G and a pair of wedge faces 38 and 39 on the opposite sides thereof. The wedge face 38 of each block E cooperates with the wedge face 36 at the inner end of the corresponding friction shoe D and the wedge face 39 cooperates with the inner wedge face 30 of the wedge block C at the same side of the mechanism. As will be evident upon reference to Figures 2 and 3, the wedge blocks E—E are also interposed between the top and bottom plate-like sections 26 of the post B. Inasmuch as the inner friction means comprising the pressure transmitting wedge blocks C—C, the friction shoes D—D and the wedge blocks E—E is interposed between the top and bottom plate-like sections 26 of the post B, the friction means is held spaced through the top and bottom walls 18 of the casing A, the plate-like sections 26 serving as means for protecting the top and bottom walls from wear.

The main spring resistance F comprises a relatively light inner coil and a heavier outer coil, the two coils having their front and rear ends bearing respectively on the inner side of the spring follower G and the end wall 19 of the casing A. The spring follower G is preferably in the form of a heavy plate having a central boss rearwardly extending therefrom and engaging within the inner coil of the spring resistance to prevent relative lateral displacement of the spring resistance F with respect to the spring follower G. As most clearly shown in Figure 1, the spring follower G is also provided with an annular seat surrounding the boss to receive the forward end portion of the inner coil of the spring resistance F.

The spring resistance F is preferably placed under initial compression when the parts are assembled so that the tendency of the spring resistance to expand will hold all of the various friction and wedge faces in contact thereby compensating for wear of these parts.

In assembling the mechanism the main spring resistance F comprising the inner and outer coils and the spring follower G are first inserted within the casing A. The friction means is then assembled with the friction post by placing the pressure transmitting wedge blocks in position on opposite sides of the post B and also placing the friction shoes D and wedge blocks E in position with the liners 23 disposed on opposite sides of the friction shoes. The assembled unit is then compressed so as to contract the same laterally and the entire unit is inserted through the other end of the casing A. As will be evident, the width of the recesses 27 of the top and bottom plate-like sections 26 of the post B permit the necessary lateral inward displacement of the liners 23 to permit the projecting ribs 24 of the liners to pass freely between the side walls of the casing A. After the ribs 24 have been brought into alignment with the slots 21 of the side walls of the casing, the entire friction means is permitted to expand so as to seat the ribs 24 within the slots 21, thereby anchoring the liners 23 to the casing A. It will be evident that due to the tendency of the main spring resistance F to expand and force the wedge blocks E—E outwardly, the liners 23 will be maintained interlocked with the walls of the casing A on account of the wedging action between the wedge blocks E and the friction shoes D and the pressure transmitting wedge blocks C. Outward movement of the post B is positively limited by engagement of the rear end walls of the notches or recesses 27 with the rear ends of the liners 23. Outward movement of the pressure transmitting wedge blocks C is limited by engagement of the lugs thereof with the post B, the block C in turn limiting outward movement of the friction shoes D—D and the wedge blocks E—E.

Assuming a compression stroke of the mechanism, the operation is as follows: The main follower 15 and the casing A will be moved inwardly relatively to each other, forcing the pressure transmitting wedge block C inwardly of the casing A. A wedging action will thus be set up between the pressure transmitting wedge blocks C, the friction shoes D—D and the wedge blocks E—E. On account of the wedging action produced, the friction surfaces of the friction shoes D will be brought into intimate contact with the friction surfaces of the liners 23 and the friction surface 29 of the pressure transmitting wedge block C will be brought into intimate contact with the friction surfaces of the post B. Due to the friction thus produced between the post B and the pressure transmitting wedge block C, the post will be carried inwardly with the blocks C during the initial portion of the compression stroke of the mechanism. During this action the friction shoes D will also slip on the friction surfaces of the liners 23. Movement of the parts inwardly will continue until the friction post is stopped by engagement of the plate-like sections 26 thereof with the abutment ribs 22 of the casing A. After movement of the post B has been stopped the pressure transmitting wedge block C will be forced to slide on the friction post B during the remainder of the compression stroke of the mechanism thereby augmenting the frictional resistance. During the inward movement of the friction means the friction shoes D—D will be forced laterally inwardly due to the converging relation of the friction surfaces of the liners thereby squeezing out the wedge blocks E—E between the wedge faces of the friction shoes D—D and the inner wedge faces of the pressure transmitting wedge blocks C. A differential action is thus produced causing a more rapid inward movement of the spring follower G than the rate of inward movement of the main follower 15, thereby producing additional compression of the main spring resistance F. The differential action of the mechanism as described will continue until the actuating force is reduced or movement of the follower 15 is limited by engagement with the front end of the casing A. Upon engagement of the follower 15 with the casing A, the actuating force is transmitted directly through the casing, the latter acting as a solid column load transmitting member to prevent the main spring F from being unduly compressed.

During release upon reduction of the actuating force, the expansive action of the main spring resistance F will force the friction means outwardly. The friction shoes D—D, the pressure transmitting wedge blocks C—C and the friction post B will be carried outwardly initially in unison with the wedge blocks E—E until movement of the post is positively limited by engagement of the wings or plate-like sections 26 of the post with the lugs 28 of the liners 23. During the remainder of the releasing action, the friction shoes E—E and the pressure transmitting wedge blocks C—C will be forced outwardly with respect to the post B until movement of the pressure transmitting block is limited by engagement of the lugs 32 thereof with the post B. Upon movement of the pressure transmitting wedge blocks being limited, movement of the friction shoes D—D and wedge blocks E—E will also be limited due to the interengaging wedge faces thereof. As will be evident, the releasing action of my improved mechanism is greatly facilitated due to the initial movement of the post during this action.

While I have herein shown and described the preferred manner of carrying out my invention, the same is merely illustrative, and I contemplate all changes and modifications which come within the scope of the claims appended hereto.

I claim:

1. In a friction shock absorbing mechanism, the combination with a friction shell having interior friction surfaces; of friction shoes cooperating with said shell friction surfaces; a friction post; wedge pressure transmitting means movable relatively to the post and having frictional engagement therewith, said wedge pressure transmitting means and friction shoes having co-operating wedge faces; wedge blocks having wedging engagement with the friction shoes and wedge pressure transmitting means; and spring resistance means opposing relative movement of said shell and wedge blocks.

2. In a friction shock absorbing mechanism, the combination with a friction shell having opposed interior friction surfaces; of a central friction element having limited movement with respect to the shell; pressure transmitting wedge means disposed at opposite sides of the central friction element and having frictional engagement therewith, said means and friction element being relatively movable; friction shoes having frictional engagement with the shell surfaces, said shoes and means having cooperating wedge faces; wedge blocks having wedging engagement with the friction shoes and pressure transmitting wedge means; and means yieldingly opposing relative movement of said wedge block and shell.

3. In a friction shock absorbing mechanism, the combination with a main follower; of a friction shell having opposed friction surfaces; of a pair of friction shoes cooperating with said shell surfaces; wedge blocks having wedging engagement with the shoes; wedge pressure transmitting means engaged directly by the follower throughout the compression stroke of the mechanism and movable in unison therewith having wedging engagement with the shoes and wedge blocks and maintaining the shoe spaced from the follower throughout the compression stroke; and means yieldingly opposing inward movement of the wedge blocks.

4. In a friction shock absorbing mechanism, the combination with a friction shell having opposed friction surfaces; of friction shoes cooperating with said shell friction surfaces; a central friction post; wedge pressure transmitting members relatively movable with respect to the post and having frictional engagement therewith, said wedge pressure transmitting members and shoes having cooperative sets of wedge faces; wedge blocks cooperating with said shoes and wedge pressure transmitting members, said wedge pressure transmitting members and wedge blocks having cooperating sets of wedge faces disposed at an inclination to the cooperating sets of wedge faces of said shoes and wedge pressure transmitting members; and spring resistance means opposing movement of said wedge blocks.

5. In a friction shock absorbing mechanism, the combination with a friction shell having interior inwardly converging opposed friction surfaces; of a central friction post; wedge pressure transmitting members having frictional engagement with the post and being relatively movable thereto; friction shoes cooperating with said friction shell surfaces; said shoes and members having cooperating sets of wedge faces; wedge blocks, said wedge blocks and shoes having cooperating sets of wedge faces, said wedge blocks and wedge pressure transmitting members also having cooperating sets of wedge faces, the cooperating sets of last named faces being disposed at a keener wedging angle than the cooperating sets of wedge faces of said shoes and wedge pressure transmitting members; and means yieldingly opposing inward movement of said wedge blocks.

In witness that I claim the foregoing I have hereunto subscribed my name this 20th day of July, 1927.

JOHN F. O'CONNOR.